United States Patent [19]
Poziomek et al.

[11] 3,910,763
[45] Oct. 7, 1975

[54] METHOD OF DETECTING ORGANOPHOSPHORUS AGENTS USING 1-PHENYL-1,2,3-BUTANETRIONE-2-OXIME AND CYANIDE INDICATING COMPOSITION

[75] Inventors: Edward J. Poziomek, Bel Air; Eleanor V. Crabtree, Towson; David N. Kramer, Stevenson, all of Md.

[73] Assignee: The United States of America as represented by the Secretary of the Army, Washington, D.C.

[22] Filed: Oct. 3, 1969

[21] Appl. No.: 868,663

[52] U.S. Cl.......... 23/232 R; 23/254 R; 260/566 A; 252/408
[51] Int. Cl.² ...................................... G01N 31/22
[58] Field of Search .............. 23/230, 232, 254 R; 260/566 A; 252/408

[56] References Cited
UNITED STATES PATENTS

| | | |
|---|---|---|
| 2,865,719 | 12/1958 | Kramer ............................. 23/230 |
| 2,867,509 | 1/1959 | Fischer et al. ...................... 23/230 |
| 2,926,072 | 2/1960 | Kramer et al. ...................... 23/232 |
| 3,567,382 | 3/1971 | Crabtree et al. .................... 23/230 |

OTHER PUBLICATIONS

Green et al., J. Chem. Soc., 1956, 3887–3892, (1956).

Saville, Analyst, 82, 269–274, (1957).

*Primary Examiner*—Benjamin R. Padgett
*Assistant Examiner*—E. A. Miller
*Attorney, Agent, or Firm*—Nathan Edelberg; Robert P. Gibson; Kenneth P. Van Wyck

[57] ABSTRACT

A monitoring system for organophosphorus compounds utilizing a multicyclic catalytic process of a cyanide ion which initiates two different procedures (1) for increasing the reaction rate for the cyanide ion production from a detector reagent; and (2) for instituting a concurrent signaling cycle indicating the presence of the phosphorus compounds.

4 Claims, No Drawings

METHOD OF DETECTING ORGANOPHOSPHORUS AGENTS USING 1-PHENYL-1,2,3-BUTANETRIONE-2-OXIME AND CYANIDE INDICATING COMPOSITION

DEDICATORY CLAUSE

The invention described herein may be manufactured, used, and licensed by or for the Government for governmental purposes without the payment to us of any royalty thereon.

This invention is directed to the detecting of organophosphorus chemical warfare agents.

It is the object of this invention to detect toxic warfare agents in their vapor state.

It is a further object of this invention to detect microquantities of warfare agents.

Our detecting method is based upon a multicyclic catalytic system, that is, the presence of a chemical warfare agent with the spontaneous decomposition of an autocatalytic detector which gives rise to the cyanide ion functioning as a catalyst in a dual role (a) for the further production of cyanide ion from the detector; and (b) for the parallel color cycle giving rise to the detection signal coupled with the regeneration of the cyanide ion. This multicyclic system is operative for the purposes of this invention whether or not there is cyanide ion liberated from the warfare agent. The general scheme is set forth below.

The organophosphorus chemical agents in this invention are known as G-Agents. The members are ethyl dimethylphosphoroamidocyanidate (GA), isopropyl methylphosphonofluoridate (GB) or pinacolyl methylphosphonofluoridate (GD).

U.S. Pat. No. 2,926,072, Kramer et al, describes a composition and method for determining about 1 gamma of G-Agents, for example, isopropyl methylphosphonofluoridate, exposing a fluid containing the Agent with a detecting crayon composition comprising an oxime and metallic cyanide.

In the monitoring system of this invention an air sample comprising at least $0.1 \mu g$ of a vaporized chemical agent contacts a detection matrix including (0.75 to 1.25) $\times 10^{-4}$ g of an autocatalytic detector 1.0 g inert adsorbent and (2.4 to 4.0) $\times 10^{-4}$ g signaling composition, then the matrix and its contents are made alkaline, about pH9, and a visible blue color forms indicating the presence of the agent. The signaling composition can be a solid mixture or a solution. There is no observable difference in time, sensitivity, or reliability in the moni-

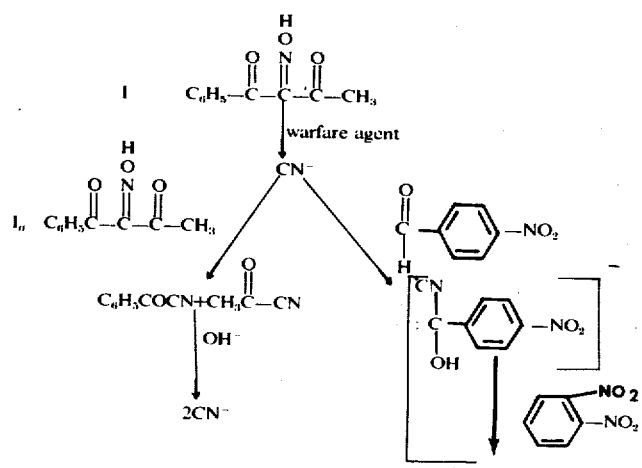

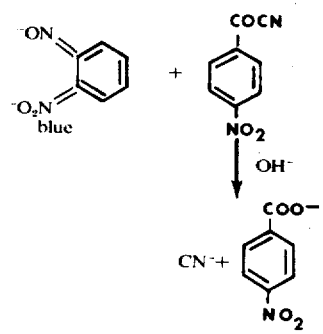

$I_n$ - Non-decomposed $I$ toring system which interchanging the solid or liquid signaling composition.

The prior art methods were not of sufficient sensitivity, reliability and simplicity for our present day needs. In view of the fact the prior art did not fulfill our requirements, an investigation was instituted to seek new avenues wherein greater sensitivity could be attained.

As a result of our investigation, a method for detecting organophosphorus compounds at a concentration level of at least 0.1 μg is now available. This low detection level is in part due to the fact that the inventive procedure is based on chemical amplification of the cyanide ion, that is, the initial cyanide ion concentration from the oxime, input, is insufficient to produce the color signal, and therefore this initial concentration is utilized to obtain a greater proportion of cyanide ion from the undecomposed oxime, output, to bring about the color detection signal.

The unobvious results of our studies is a system comprising at least 0.1 μg of chemical warfare agent in the presence of an autocatalytic detector and signaling composition giving rise to a blue color detecting signal in about 5 minutes, whereas the system in the absence of said agent produces a blue color detection signal in a time of at least 8 minutes. The reduction in the time requirement for producing the detection signal was not anticipated by us and, in addition, with this observable short time frame phenomenon, there is no opportunity for error by the investigator in affirmatively concluding the presence or absence of the chemical agent. At higher concentrations of agent at about 0.3 μg the time frame is even shorter, that is 3 minutes is required for the production of the color signal.

A further interesting result is that the chemical warfare agent does not have to liberate any cyanide ion from itself in order to produce the detecting signal. However, ethyl dimethylphosphoroamidocyanidate in our inventive system suggest a shorter time necessary to produce the colored signal, this may be due in part to the enhancement of available cyanide ion from the agent thus increasing the reaction rate in the presence of the oxime for producing the detection signal.

The art now has a system which is about 10 times more effective than other known methods, U.S. Pat. No. 2,926,072, 0.1 gamma as compared with 1.0 gamma, respectively.

The inert supporting adsorbent in this invention is commercially available silica gel. We found no distinction in carrying forward our process between the washed and unwashed form or in the various particle sizes of the gel.

The liquid signaling composition is a mixture comprising (1.3 to 2.1) × $10^{-4}$ g o-dinitrobenzene and (1.1 to 1.9) × $10^{-4}$ g p-nitrobenzaldehyde with the addition of about 10 ml of a solvent, methylene chloride. The solid signaling composition is a mixture comprising 10–20 mg of o-dinitrobenzene and 10–20 mg of p-nitrobenzaldehyde employed with 1 g of silica gel. For optimal results in our monitoring system, the preparation and use of the liquid signaling composition is carried out in the absence of an intense direct light source and utilization within about 10 minutes of compounding.

The detection tube comprises a hollow glass cylinder (3–4 inches long and 3 mm inner diameter), detection matrix and two organdy plugs holding the matrix in place. The tube is then inserted into the sampling device.

In preparing the detection matrix containing an autocatalytic detector, the solid signaling composition, about 0.75 to 1.25 g of silica gel is thoroughly mixed with the said solid composition, previously described, and then inserting the final mixture as the matrix into the glass cylinder; the ends of the cylinder are sealed off by heating, for example, and prior to use, the ends are broken off exposing the matrix for receiving the vapor agent through the plugs. Utilizing the liquid signaling composition in lieu of said solid composition in preparing the matrix, the inert adsorbent is first inserted into the glass cylinder, closing the glass ends with organdy plugs, then impregnating the adsorbent with one (1) drop of the prepared signaling composition through the plugs and subsequently drawing unpolluted air through the detection matrix thus removing the solvent, and the matrix is now ready for use.

The monitoring system utilizing the liquid signaling composition is more readily usable and less cumbersome when employed in laboratory as compared with mobile field use in view of the fact that the separate components must be mixed just prior to impregnating the adsorbent and the short time duration for use, about 10 minutes, after preparing the detection matrix. However, in field use as encountered by the military forces in combat areas, the employment of the solid signaling composition is an obviously more practical choice.

The following compounds are inoperative to produce an influencing catalytic mechanism functioning in a dual capacity for a multicyclic procedure for our monitoring system due to high blanks. Isonitrosoacetylacetone, diisonitrosoacetone, and oximes of 3-pyridineglyoxal monoxime, 4-pyridinealdoxime, monoisonitrosoacetone oxime, α-oximino-α-cyanoacetophenone or phenylgloxaldoxime.

The apparatus employed for indicating the presence of the toxic material is disclosed by Crabtree et al, Talanta, 14, 857 (1967). The apparatus can be assembled from equipment readily available in the laboratory. In the following description, the lettered components correspond to the same component in the apparatus description in the aforementioned Talanta publication. A 2×9 cm test tube B, with a capacity of about 12 ml is fitted with 19/38 standard taper joint with an adapter C, supporting a side-arm air inlet A, length of glass tubing extending to about 5 to 10 mm from the bottom of test tube. The detection tube D, containing the detection matrix is connected by a short length of rubber tubing to the upper end of the glass tubing. The air sample through the air inlet is drawn through the matrix by compressing a rubber bulb E, fitted with a one-way valve. The tube D, is removed and a drop of 0.5 N alkali metal hydroxide, sodium or potassium, is added to the matrix and its contents whereby a blue color indicates a positive test.

As a result of our invention, a sample, in a hostile environment suspected of containing toxic agents can be demonstrated by contacting a sample with the detecting matrix and observing a visible color in about 5 minutes or less. This small time frame is of utmost importance in determining whether or not the soldiers are in a contaminated environment.

EXAMPLE 1 a. An air sample comprising about 0.10 to 0.3 $\mu$g of an organophosphorus vaporized agent, isopropyl methylphosphonofluoridate, contacting a transparent detecting tube containing about 0.1 g of a detection matrix prepared from a mixture including an inert adsorbent and solid signaling composition. Adding about one (1) drop of aqueous 0.5 N sodium hydroxide to the detection matrix and its contents and observing the blue color of the silica gel in about 5 to 3 minutes after the addition of the hydroxide, thus indicating the presence of the agent.

b. The procedure in (a), supra, was repeated with the proportion of 0.3 $\mu$g of the agent and the silica gel turning blue about 3 minutes after addition of the hydroxide.

EXAMPLE 2 a. The detecting method is carried out in the same manner as in Example 1, using however 0.10 to 0.3 $\mu$g of the agent ethyl dimethylphosphoroamidocyanidate or pinacolyl methylphosphonofluoridate in lieu of isopropyl methylphosphonofluoridate. The blue detecting signal was visible about 5 to 3 minutes after the addition of the hydroxide. b. The procedure in (a), supra, was followed utilizing 0.10 $\mu$g of the agent thus giving rise to the detecting signal within 5 minutes after the hydroxide addition.

EXAMPLE 3

Following the detecting procedure for the organophosphorus compounds isopropylmethylphosphonofluoridate, ethyl dimethylphosphoroamidocyanidate or pinacolyl methyl-phosphonofluoridate, in Examples 1 and 2, supra, with the substitution of a liquid signaling composition in lieu of the solid signaling composition in the detection matrix, the blue detection signal was developed in substantially the time frame as with solid composition indicating the presence of the phosphorus compounds.

We claim:

1. A detection method comprising the steps of contacting organophosphorus chemical warfare agents with a detecting matrix including an inert absorbent, an autocatalytic detector of 1-phenyl-1,2,3-butanetrione 2-oxime, and signaling composition of a mixture comprising o-dinitrobenzene and p-nitrobenzaldehyde, the matrix and its contents producing cyanide ions and indicating the presence of the warfare agents, a portion of said cyanide ions react with said autocatalytic detector producing additional cyanide ions and remaining portion of said cyanide ions react with said signaling composition producing a color signal with regeneration of said remaining portion of cyanide ions.

2. A method according to claim 1, wherein the chemical warfare agents are ethyl dimethylphosphoroamidocyanidate, isopropyl methylphosphonofluoridate or pinacolyl methylphosphonofluoridate.

3. A method according to claim 1, wherein the matrix and its contents are made alkaline with an aqueous alkali metal solution.

4. A method according to claim 1, wherein the inert adsorbent is silica gel.

* * * * *